United States Patent
Lojen

(10) Patent No.: US 7,223,014 B2
(45) Date of Patent: May 29, 2007

(54) REMOTELY PROGRAMMABLE INTEGRATED SENSOR TRANSMITTER

(75) Inventor: John Lojen, Montreal (CA)

(73) Assignee: Intempco Controls Ltd., St. Laurent, Québec (CA)

( * ) Notice: Subject to any disclaimer, the term of this patent is extended or adjusted under 35 U.S.C. 154(b) by 253 days.

(21) Appl. No.: 10/401,145

(22) Filed: Mar. 28, 2003

(65) Prior Publication Data

US 2004/0190592 A1 Sep. 30, 2004

(51) Int. Cl.
G01K 1/16 (2006.01)
G01K 7/16 (2006.01)

(52) U.S. Cl. ............... 374/120; 374/183; 702/99
(58) Field of Classification Search ............ 374/1, 374/172, 183, 170, 171, 100, 163, 185; 702/130, 702/85–86, 99, 104; 340/870.21; 341/155, 341/110; 324/115, 601–605, 607–611; 73/1.88
See application file for complete search history.

(56) References Cited

U.S. PATENT DOCUMENTS

| | | | |
|---|---|---|---|
| 4,000,454 A | | 12/1976 | Brakl |
| 4,041,382 A | * | 8/1977 | Washburn ............... 374/1 |
| 4,102,199 A | * | 7/1978 | Tsipouras ............... 374/167 |
| 4,122,719 A | | 10/1978 | Carlson et al. |
| 4,198,676 A | | 4/1980 | Varnum et al. |
| 4,203,104 A | * | 5/1980 | Kmetz ............... 345/40 |
| 4,367,959 A | * | 1/1983 | Wiget ............... 345/33 |
| 4,468,968 A | * | 9/1984 | Kee ............... 73/708 |
| 4,480,312 A | | 10/1984 | Wingate |
| 4,528,637 A | | 7/1985 | Smith ............... 373/108 |
| 4,556,330 A | | 12/1985 | Regtien |
| 4,562,554 A | | 12/1985 | Stixrud et al. |
| 4,669,049 A | | 5/1987 | Kosednar et al. |
| 4,695,955 A | * | 9/1987 | Faisandier ............... 600/300 |
| 4,718,776 A | | 1/1988 | Gilland et al. |
| 4,746,879 A | | 5/1988 | Ma et al. |
| 4,783,659 A | | 11/1988 | Frick ............... 340/870.37 |
| 4,788,539 A | * | 11/1988 | Frey ............... 345/35 |
| 4,901,257 A | * | 2/1990 | Chang et al. ............... 374/172 |

(Continued)

FOREIGN PATENT DOCUMENTS

DE 24 59 623 A1 6/1975

(Continued)

OTHER PUBLICATIONS

"RTD Signal Conditioner DRN/DRX Series", "The Data Acquisition Systems Handbook, 21st Century", 2nd Edition (no month, 2000), OMEGA Engineering, Inc., p. C-8.*

(Continued)

Primary Examiner—G. Bradley Bennett
(74) Attorney, Agent, or Firm—Ogilvy Renault, LLP

(57) ABSTRACT

A remotely programmable integrated sensor transmitter device for measuring and reporting a physical quantity of a given medium comprises a sensor for measuring a physical quantity of a medium and providing an electrical output as a function of the property measured, a scaler module for receiving the electrical output and for producing a scaled analog signal as a function of the physical quantity and a scale selection input, and a data interface for receiving programming data from an external computer and for providing the scale selection output to the scaler module.

13 Claims, 7 Drawing Sheets

U.S. PATENT DOCUMENTS

| | | | | |
|---|---|---|---|---|
| 4,930,095 | A | * | 5/1990 | Yuchi et al. ............... 73/1.88 |
| 5,038,303 | A | | 8/1991 | Kimura |
| 5,056,048 | A | | 10/1991 | Seperant |
| 5,066,954 | A | * | 11/1991 | Burgel et al. ............... 341/155 |
| 5,116,136 | A | | 5/1992 | Newman et al. |
| 5,143,452 | A | | 9/1992 | Maxedon et al. |
| 5,197,334 | A | * | 3/1993 | Guziak ............... 73/708 |
| 5,253,511 | A | * | 10/1993 | Jaramillo et al. ............ 73/1.88 |
| 5,255,975 | A | | 10/1993 | Adams |
| 5,381,954 | A | | 1/1995 | Tokizaki |
| 5,444,644 | A | * | 8/1995 | Divjak ............... 702/64 |
| 5,449,234 | A | * | 9/1995 | Gipp et al. ............... 374/185 |
| 5,528,519 | A | * | 6/1996 | Ohkura et al. ............. 702/104 |
| 5,532,581 | A | * | 7/1996 | Ohkura et al. ............. 324/115 |
| 5,604,684 | A | * | 2/1997 | Juntunen ............. 702/104 |
| 5,638,418 | A | | 6/1997 | Douglass et al. |
| 5,655,841 | A | | 8/1997 | Storm |
| 5,669,713 | A | * | 9/1997 | Schwartz et al. ............. 374/1 |
| 5,741,074 | A | | 4/1998 | Wang et al. |
| 5,764,546 | A | * | 6/1998 | Bryant et al. ............. 702/108 |
| 5,857,777 | A | | 1/1999 | Schuh |
| 5,912,595 | A | | 6/1999 | Ma et al. |
| 6,074,089 | A | | 6/2000 | Hollander et al. ............. 374/181 |
| 6,085,156 | A | * | 7/2000 | Rust et al. ............. 702/91 |
| 6,098,095 | A | * | 8/2000 | Nelson et al. ............. 709/208 |
| 6,115,441 | A | | 9/2000 | Douglass et al. |
| 6,188,340 | B1 | * | 2/2001 | Matsumoto et al. ............. 341/110 |
| 6,283,628 | B1 | | 9/2001 | Goodwin |
| 6,307,496 | B1 | * | 10/2001 | Ikuta et al. ............. 341/155 |
| 6,324,482 | B1 | * | 11/2001 | Nakagaki et al. ............. 702/104 |
| 6,362,616 | B1 | | 3/2002 | Lo ............. 324/146 |
| 6,370,448 | B1 | * | 4/2002 | Eryurek ............. 700/282 |
| 6,588,931 | B2 | * | 7/2003 | Betzner et al. ............. 374/185 |
| 6,612,737 | B1 | * | 9/2003 | Lobban ............. 374/183 |
| 2002/0078732 | A1 | * | 6/2002 | Bentley ............. 73/1.88 |
| 2004/0083834 | A1 | * | 5/2004 | Endo et al. ............. 73/866.1 |

FOREIGN PATENT DOCUMENTS

| | | | |
|---|---|---|---|
| GB | 2132766 | A * | 7/1984 |
| WO | WO 9208279 | A2 * | 5/1992 |

OTHER PUBLICATIONS

Cummins, T. et al., "An IEEE 1451 standard transducer interface chip with 12-b ADC, two 12-b DAC's, 10-kB flash EEPROM, and 8-b microcontroller," Solid-State Circuits, IEEE Journal of; vol. 33, Issue: 12;pp. 2112-2120 (Dec. 1998).* de Jong, P.C. and Meijer, G.C.M.; "A high-temperature electronic system for pressure-transducers," Instrumentation and Measurement, IEEE Transactions on, vol. 49, Issue: 2; INSPEC Accession No.6612176; pp. 365-370 (Apr. 2000).*

Paul C. de Jong and Gerard C. M. Meijer, "High-temperature pressure transducer interface," Proc. SPIE Int. Soc. Opt. Eng. 3328, 285-296 (Mar. 1998).*

Guijie Wang and Gerard C. M. Meijer, "Smart measurement system for resistive (bridge) or capacitive sensors," Proc. SPIE Int. Soc. Opt. Eng. 3328, 260-264 (Mar. 1998).*

"Mixed signal integrated circuit provides plug-and-play data acquisition", I&CS, p. 85 (Jun. 1998).*

Analog Devices, Inc., "ADuC812 MicroConverter(R), Multichannel 12-Bit ADC with Embedded Flash MCU", pp. 1, 9, 12, 56, 22, 57; Rev. E (Apr. 2003); downloaded from www.ANALOG.COM website Jul. 2005.*

Licht, T.R., "The IEEE 1451.4 proposed standard," Instrumentation & Measurement Magazine, IEEE, vol. 4, Iss.1, (Mar. 2001), pp. 12-18.*

Dunbar, M.L., "Single chip ASICs for smart sensor signal conditioning," WESCON/98 , vol. no.pp. 44-50, Sep. 15-17, 1998.*

Potter, D., "Smart plug and play sensors," Instrumentation & Measurement Magazine, IEEE, vol. 5, No. 1pp. 28-30, Mar. 2002.*

Brochure of Omega's Multifunction Service Logger Model OM-60, 2 pages, no date.

Brochure of Omega's Printing/Logging Handheld Thermometer HH610 Series, 2 pages, no date.

Thermo Electric Product Information Bulletin, 6 pages, no date.

Moore Industries Data Sheet 149-710-03F, May 1985, EP RBX RBX, 2-Wire Resistance Bulb Transmitters, 2 pages.

Moore Industries Data Sheet 700-710-75A, Jan. 1986. EP TCX 2-Wire Thermocouple Transmitter, 2 pages.

Rosemount Inc. Brochure, Model 244R Temperature Transmitters and Accessories, 2 pages, no date.

Analog Devices Brochure: "Single Supply 16-Bit Sigma-Delta Stereo ADC", 2002, Analog Devices, Norwood, MA, USA.

* cited by examiner

REMOTELY PROGRAMMABLE INTEGRATED SENSOR TRANSMITTER

FIELD OF THE INVENTION

This invention relates to temperature sensors, more particularly to a temperature sensor including an RTD element, a conditioning circuit, a scaler unit and a combined digital and analog transmitter, all in a single compact assembly. The remotely programmable integrated sensor transmitter can also be re-calibrated and re-scaled over its entire range (−200° C. to 800° C.).

BACKGROUND OF THE INVENTION

The temperature is often a critical variable that needs to be measured accurately in various industrial processes. Today, the RTD (Resistive Temperature Detector) is the most popular device used in temperature control. With an RTD element, we can obtain a resolution of hundredth or even thousandths of a degree centigrade in an ambient or moderate temperature application.

The temperature cannot be measured directly from the RTD element. It has to be calculated from the measurement of a dependant variable that has a known relation with the temperature at which it is exposed. Unfortunately this relation, which is well known by the people working in this field, is not linear and for most of the application it is not convenient to have a non-linear signal. To solve this problem, many solutions have been proposed. German Patent No. 2,459,623 to Bruyere discloses a design in which an extra resistor is connected between an amplifier output and input and a referenced resistor. This method of linearization is not that accurate, greater than one part in thousand over the entire range, and is also highly dependent on the component tolerance used in the circuit. That, obviously, poses manufacturing problems.

Other techniques have been proposed in U.S. Pat. Nos. 4,000,454 and 4,556,330 where they used an external linearization apparatus in which the voltage impressed to the conditioning section (a Wheatstone Bridge) changes as the resistance of the element changes. However, this arrangement contained also some disadvantages. First, the external placement of the linearization module provides, often, inaccurate readings by the fact that the sensing element and the linearization module are not integrated. Secondly, those devices are known to be unstable, whereby the failure of one or more components result in the failure of the entire device. Finally, the use of separate components increases the manufacturing and installation cost and can also be a problem on installation where the clearance is limited.

To overcome those problems, the U.S. Pat. No. 5,741,074 proposed a linear integrated sensing transmitter. This transmitter integrates, in a single housing, the temperature sensing device and a current transmitter. The linearization is performed via a feedback resistor, a return path resistor, and a constant current source, all connected to a voltage-to-current converter. This arrangement gives a good linearization and offers an accuracy of <0.1% of the full-scale. However, this device has also many lacks. First, the device cannot be calibrated to take in account the tolerance of the RTD element or the components themselves. That implies problems in a manufacturing point of view by the fact that we have to take a special care to the components selection. If the device is not perfectly linear, or offset, there is no way to correct it. Secondly, to change the range of operation of the device, we have to re-calculate and change all the resistor values. That is also causing a problem because we need different configuration for different range of operation.

The purpose of the present invention is to overcome those problems by suggesting an integrated transmitter, which includes the sensing element, a current transmitter and a scaler unit. The scaler unit gives more flexibility to the device and allows the calibration and re-scaling of the device via a digital communication between the device itself, and a hand-held programmer or a computer.

SUMMARY OF THE INVENTION

Accordingly, an object of the present invention is to provide a remotely programmable sensor and device for measuring a physical quantity of a medium comprising a sensor for measuring the physical quantity of the medium and providing an electrical output; a scaler module for receiving the sensor output and for producing a scaled analog signal as a function of the measured physical quantity and a scale selection input; and a data interface for receiving programming data from an external computer and for providing the scale selection output to the scaler module.

BRIEF DESCRIPTION OF THE DRAWINGS

The other features and advantages of the invention will be apparent from the following detailed description of each drawing.

DETAILED DESCRIPTION OF THE PREFERRED EMBODIMENT

Figure 1:
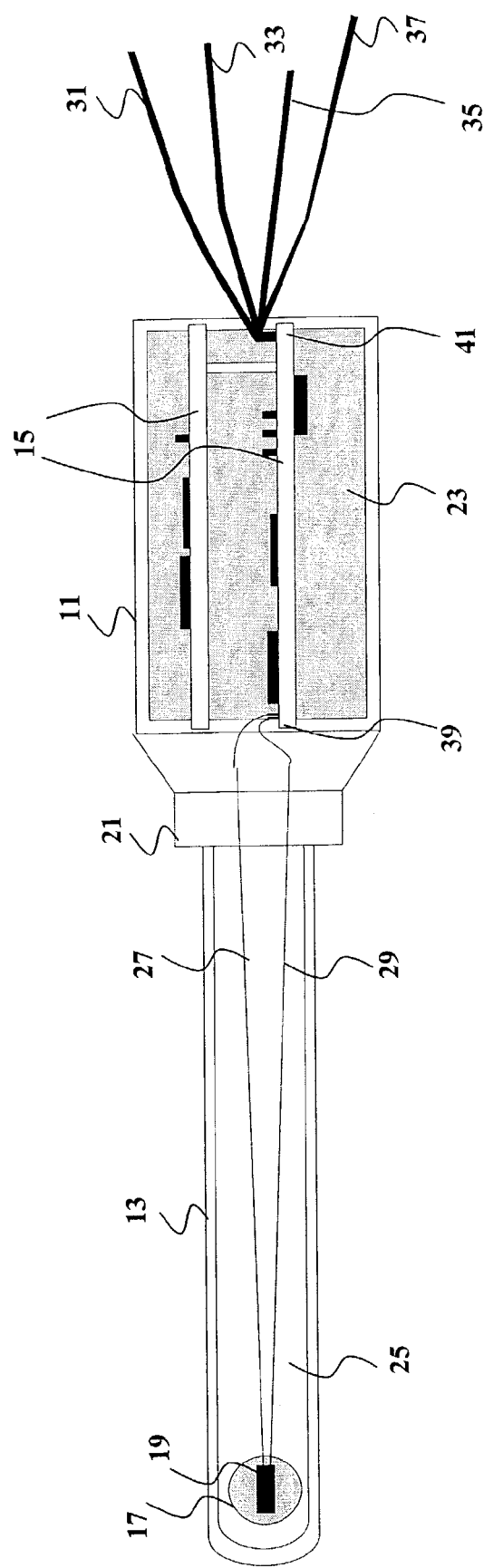
FIG. 1 represents the mechanical construction of the integrated sensor transmitter.

With reference now to FIG. 1 there is shown an exemplary embodiment of the integrated resistance temperature detector and transmitter of the present invention. The sensor comprises an elongated cylindrical housing 11,13 for receiving a miniaturized transmitter 15 coupled to a resistance temperature detector 17, 19.

The housing 11,13 is preferably fabricated from Inconel™ or a 316 stainless steel, although it can be fabricated from any suitable metal which is capable of protecting the sensing element 17,19 while quickly responding to changes in temperature. The housing 11,13 comprises a cylindrical tip portion 13 and a cylindrical transition portion 11. The tip portion 13 and the transition portion 11 are connected together by crimping, soldering, bonding or welding the transition portion around the tip portion 21, the assembled housing 11,13 defines a cavity therethrough 23,25.

In the exemplary embodiment shown in FIG. 1 the transition portion of the housing 11 has a length of 2½" and an outer diameter of ⅝" (0.625). The tip portion of the housing 13 has a length of 12" and an outer diameter of ¼". It should be understood that the above dimensions are merely illustrative and may be altered to adapt the sensor to different applications.

Disposed within the cavity of the tip portion 25 of the housing is the resistance temperature detector 17, 19 which comprises a 100 ohm, 0.00385 alpha Class B type bulb 17, although a Class A bulb can be substituted. Disposed within the bulb is a platinum resistive element 19. The resistive element 17,19 includes a first platinum lead 27 and second platinum lead 29 which extend from within the bulb. Again it is to be understood that the present invention is not restricted to the above resistance temperature detector; other temperature sensing means, such as a thermistor or a thermocouple, fall within the scope of this invention.

Disposed within the transition portion of the housing 11 is the miniaturized transmitter 15. The exemplary embodiment shown in FIG. 1 incorporates a transmitter 15 with 4–20 mA output signal 31,33. Again it is to be understood that the present invention is not restricted to the above output signal; other signal output means, such as voltage, frequency or digital, fall within the scope of this invention. The transmitter 15 is miniaturized using well known surface mount technology. At the input section 39 of the transmitter, there are four terminals, comprising of the first, second, third and a fourth input terminals. Minimum two input terminals are required from the sensing element 17,19. At the output section 41 of the transmitter, there are four terminals comprising a first output terminal 31 and a second output terminal 33, a first communication terminal 35 and a second communication terminal 37. (Additional terminals may be used, depending on the communication protocol.) The transmitter is secured within the cavity 23 of the transition portion of the housing 11 with an amount of sealant or any suitable potting compound.

Figure 2:
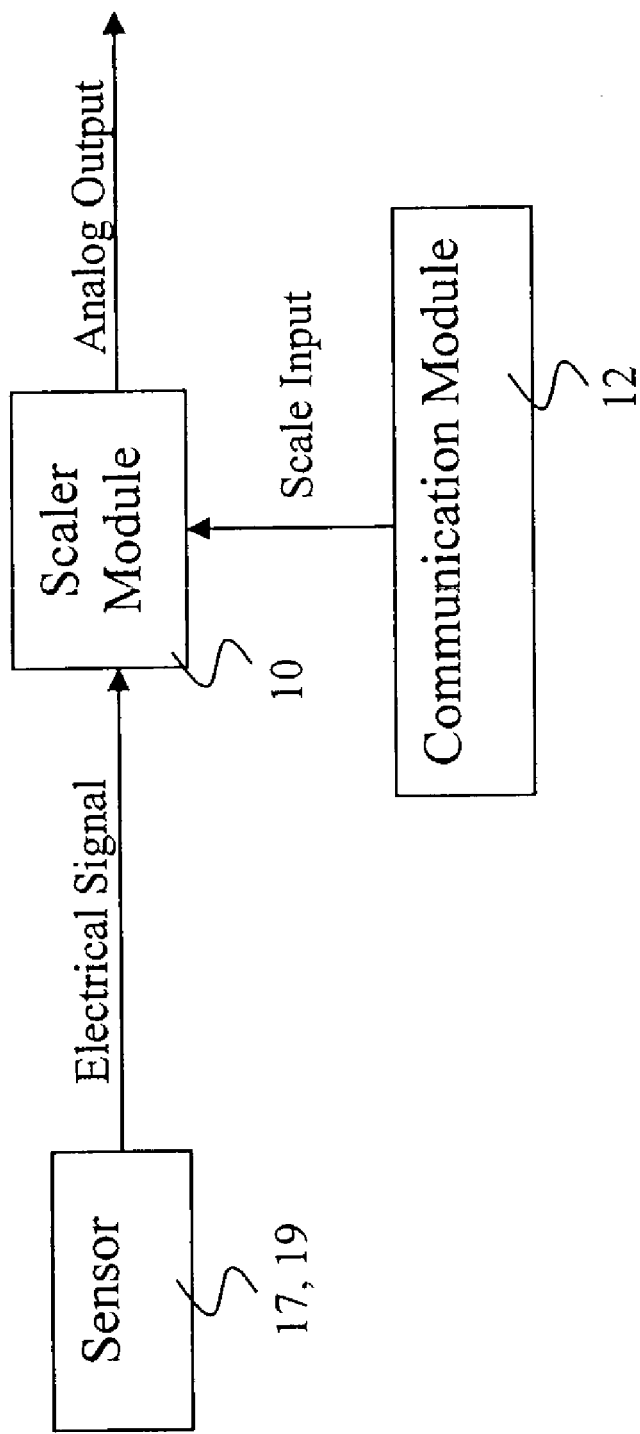

FIG. 2 is a block diagram of a remotely programmable integrated sensor transmitter. A sensor 17,19 is in primary contact with a process medium, measuring particular processes of that medium, such as temperature, pressure, etc. by relating those properties to electrical signals, such as voltage, current, etc. In the preferred embodiment, the sensor 17,19 is used for measuring temperature and it is a resistance temperature detector, while it could also be a thermistor, a thermocouple, an IC sensor, etc. The sensor 17,19 creates an electrical signal as a result of a changing property of the process medium. The electrical signal is sent to a scaler module 10. The scaler module 10 receives scale input information from a communication module 12. The scale input information allows the scaler module 10 to convert the electrical signal received from the sensor 17 into a scaled analog signal according to a desired scale. The scaled analog signal produced is then output.

Figure 3:
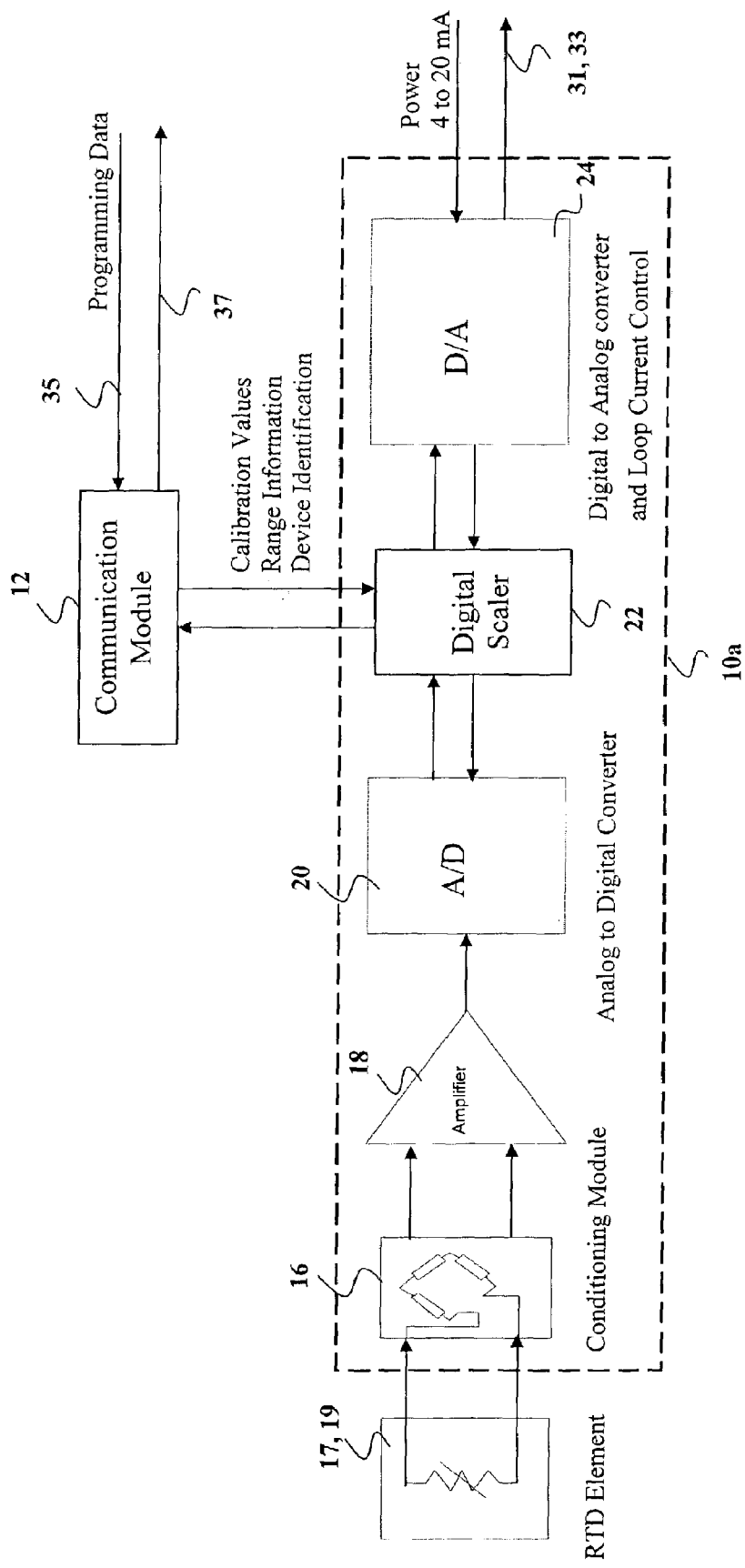
FIG. 3 is a block diagram of a digital embodiment of the present invention.

FIG. 3 is a block diagram representing one possible embodiment of the integrated sensor transmitter. At the extremity, the Resistive Temperature Detector (RTD) 17 is connected to the conditioning circuit of the integrated sensor transmitter 16, 18. This conditioning module is composed of a Wheatstone Bridge 16 and an amplifier 18. The Bridge 16 produces a small voltage across its extremities when the RTD resistance 17 changes with temperature. This small voltage is then amplified 18 and directed to the Analog to Digital converter 20. The conditioning module 16,18 was designed in such a way as to be able to measure a change of resistance of the RTD 17 from 15 to 380 ohms. That covers the entire range of the integrated sensor transmitter which is −200° to 800° C.

The Analog to Digital converter 20 converts the analog signal to a digital value which is read by a digital scaler 22. The high resolution of the Analog to Digital converter 20 allows a high precision measurement over the entire range of operation and eliminates the need for re-scaling the conditioning module. The Analog to Digital converter 20 has also, a built in auto-calibration feature. This feature allows a periodically auto re-calibration of the device to eliminate any drift due to a change of temperature.

Figure 5A:
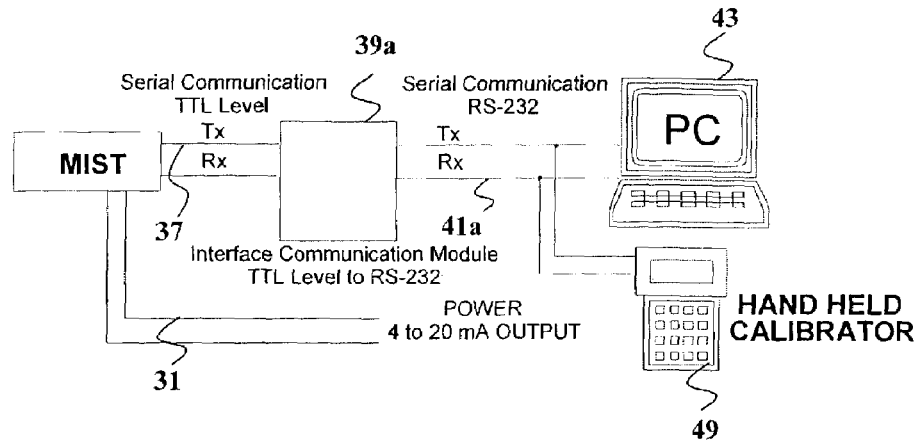
FIG. 5a is a block diagram of the remotely programmable integrated sensor transmitter configured for RS-232 communication.
Figure 5B:
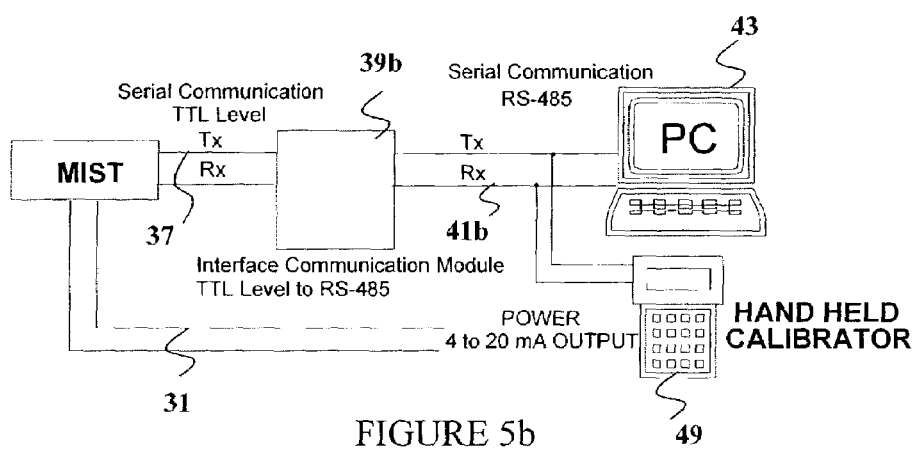
FIG. 5b is a block diagram of the remotely programmable integrated sensor transmitter configured for RS-485 communication.
Figure 5C:
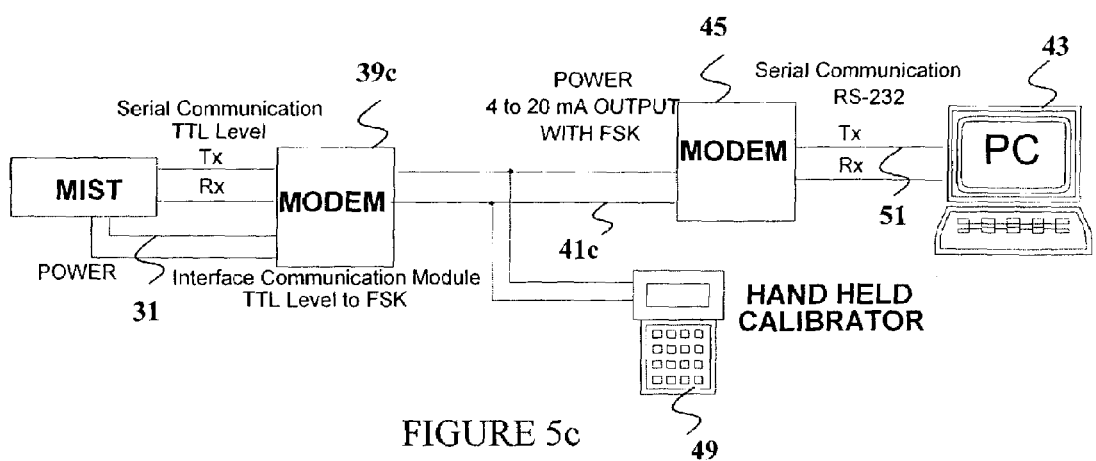
FIG. 5c is a block diagram of the remotely programmable integrated sensor transmitter configured for FSK communication with HART protocol.

The Analog to Digital converter and the Digital to Analog converter are controlled by the digital scaler 10a. The digital scaler 10a receives calibration parameters, range information and device information and identification (address) from a communication module 12. The communication module 12 is connected to the external world for exchanging data and calibration of the device via a digital communication link 35,37. The flexibility of the device allows for different modes of communication, as shown in FIGS. 5a, 5b and 5c. The standard communication interface is RS-232, but a communication interface board can be mounted in piggy back with the integrated sensor transmitter to offer an RS-485 or FSK (Frequency Shift Key) with HART protocol. The digital communication will be explained in details later.

Figure 4:
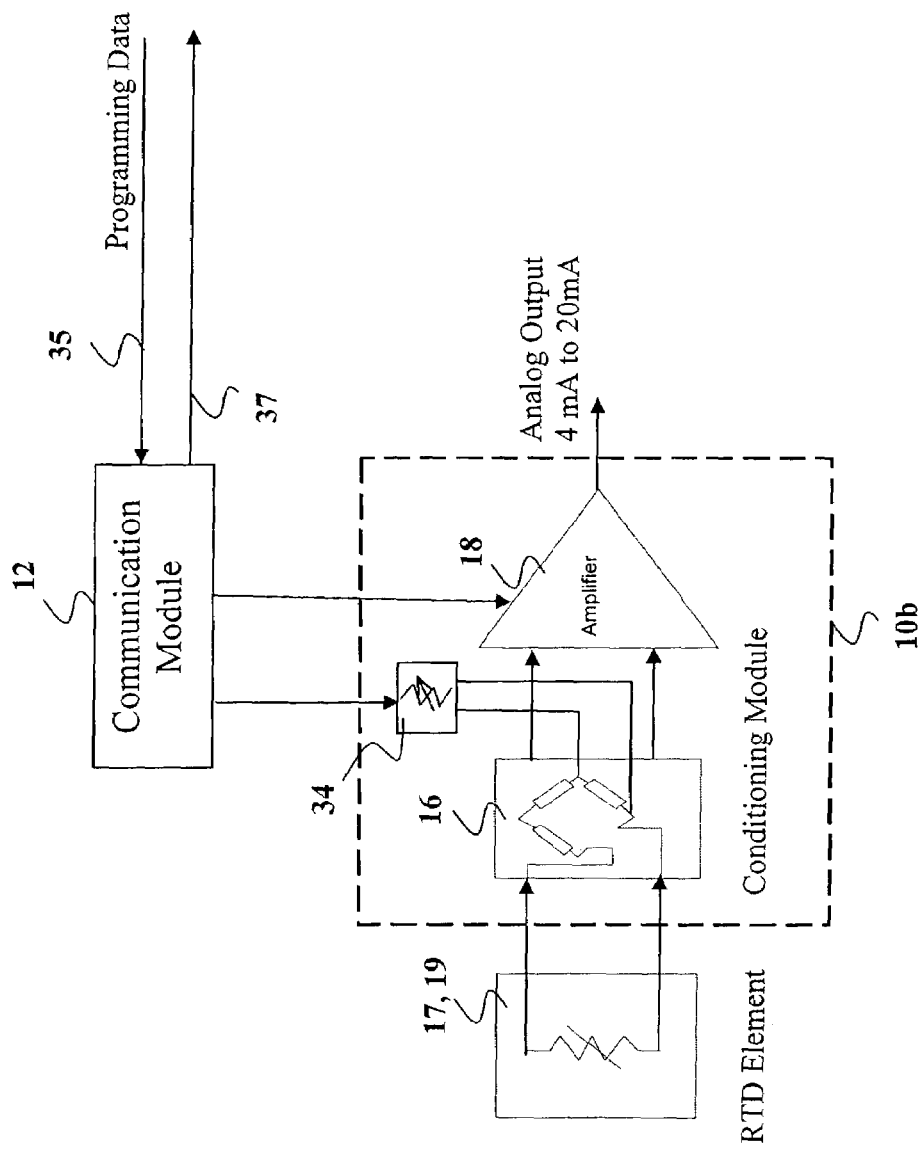
FIG. 4 is a block diagram of an analog embodiment of the present invention.

FIG. 4 is a block diagram of another embodiment of the present invention. A sensor 17,19 is in communication with a conditioning module comprising a Wheatstone bridge 16 and an amplifier 18 of variable gain. The Bridge 16 produces a small voltage across its extremities when the RTD resistance 16 changes with temperature. This small voltage is then amplified by an amplifier 18 and output as a current signal of 4 mA to 20 mA. The conditioning module was designed in a such way as to be able to measure a change of resistance of the RTD from 15 to 380 ohms, covering the entire range of the integrated sensor transmitter. A variable resistor 34, such as a potentiometer, is connected in parallel to the Wheatstone bridge 16 for controlling the resistances therein. The variable resistor 34 is controlled by the communication module 12. The communication module 12 also controls the gain of the amplifier 18 in order to produce an appropriate analog output value.

Digital Communication

The digital communication allows configuration of the integrated sensor transmitter as well as the identification (address), calibration, re-scaling and reading of temperature. FIG. 5a shows the standard serial method of communication, over two wires with the RS-232 standard. In this configuration, the integrated sensor transmitter is connected to an interface communication module 39a. This module 39a converts the low voltage signal (TTL-5V) 37 to an RS-232 standard 41a that can be read by a computer 43 or a hand held calibrator 49. The module 39a can also provide the power for the integrated sensor transmitter.

FIG. 5b represents the second method of digital communication available, the RS-485 standard. The integrated sensor transmitter is connected to an interface communication module 39b. This module 39b converts the low voltage signal (TTL-5V) 37 to an RS-485 standard 41b that can be read by a computer 43 or a hand held calibrator 49. The module 39b can also provide the power for the integrated sensor transmitter. The RS-485 standard allows longer distance between the integrated sensor transmitter itself and the computer 43 or other calibration device. It also allows for operation of multiple integrated sensor transmitters connected on the same link, each integrated sensor transmitter being identified by its unique address.

FIG. 5c represents the third method of digital communication, via a Frequency Shift Key (FSK) superimposed on the current loop. In this configuration, the interface communication module 39c is a modulator/demodulator (MODEM) that converts the signal 37 from the integrated sensor transmitter to a FSK and superimposed this frequency signal on the current loop 41c. This module 39c is mounted in piggyback with the integrated sensor transmitter and both are encapsulated in the hand of the integrated sensor transmitter. The digital data can then be achieved to a calibrator 49 having the FSK implemented or to a computer 43 via a modulator/demodulator (MODEM) 45 which convert the FSK to an RS-232 standard signal 51. The main advantage of this method of communication is having only two wires coming out of the integrated sensor transmitter for powering, analog output and digital communication. In this configuration, the transmitter uses the HART protocol, which is a well known standard in the industry, to dialogue with other equipment. Independently the digital communication used, the 4 to 20 mA current loop 31, 33 is always available to read the temperature. The integrated sensor transmitter can work as a stand-alone unit without digital communication. The purpose of the digital communication is to allow for re-calibration or re-scaling of the device.

Program

Figure 6:
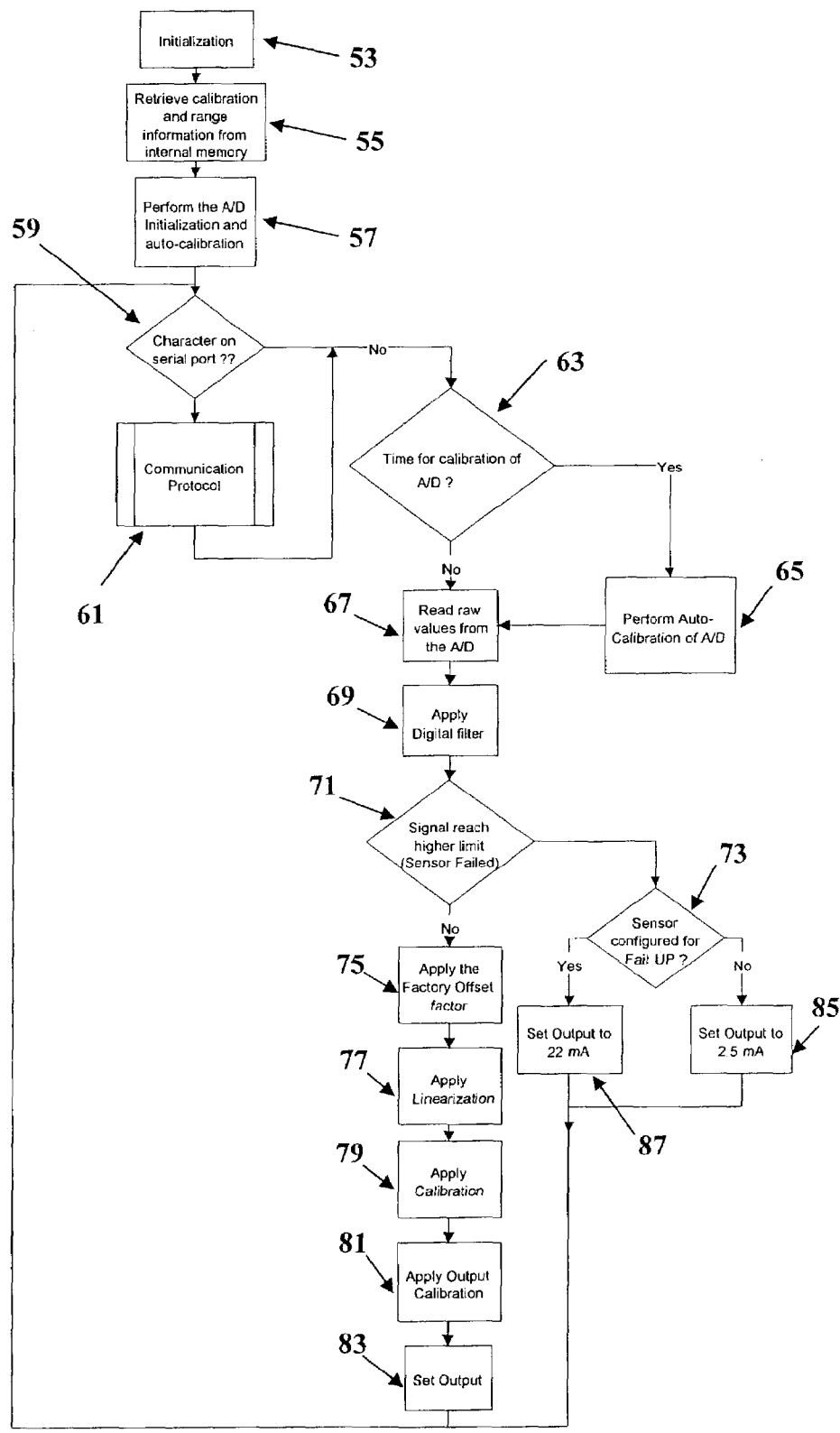
FIG. 6 represents the flow chart of the program inside the scaler unit

In the digital scaler 22, a program manages the functioning of the integrated sensor transmitter. FIG. 6 shows the flow chart of this program. During the boot up sequence, the processor first initializes the memory and all the peripherals 53. After that, it retrieves the calibration and range information from the memory 55 and performs the initialization and calibration of the Analog to Digital converter 57. The program then enters in the main loop and check for an external command on the serial port 59. If data is present on serial port, then the scaler unit accomplishes the task associated to the code in accordance with the communication protocol 61. The next step is to check for auto-calibration of the Analog to Digital converter 63. If this is the case the scaler unit commands the auto-calibration 65. The following action is the reading of the input signal from the sensing element via the Analog to Digital converter 67. The result, under a digital format, is then filtered digitally by an algorithm implemented in the processor 69. If the result is higher or lower than a certain threshold value, the sensing element is considered failed 71. If this is the case the current output is set to a maximum 87 or minimum 85 value depending the configuration 73. If the signal read from the sensing element is in the limit of operation, then a factory offset factor is applied 75 to it. The factory offset and others calibration features are explain in the next section. After the factory offset, the reading is linearized by the processor 77 and the input 79 and output 81 calibration are performed. Finally, the current loop is set 83 to the corresponding reading.

Calibration and Scaling of the Remotely Programmable Integrated Sensor Transmitter One of the most important features of this invention is the fact that the device can be re-calibrated and re-scaled at any time without having to change the device physically.

Figure 7:
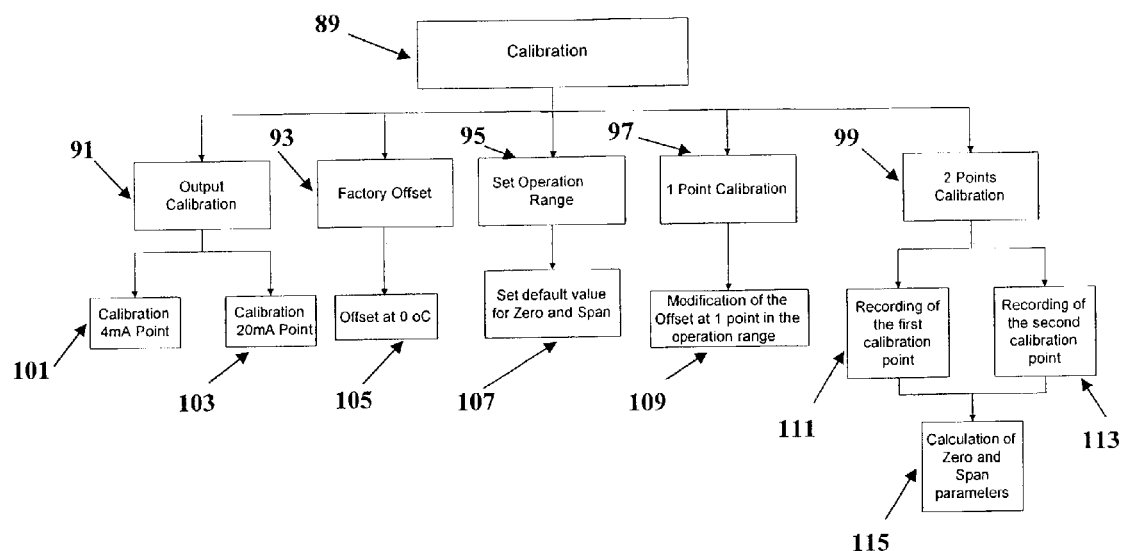
FIG. 7 is a tree diagram of the different calibration procedures available to the remotely programmable integrated sensor.

This is a big advantage for a manufacturing point of view because all the devices are assembled with the same components. No need to change any resistors or amplifiers to match a different range. The fact that the device can be calibrated allows also a certain tolerance for all the components, including the sensing element. That tolerance is compensated by the calibration. For the end-user this is also an advantage. The sensor can be re-scaled for any particular application and this mean that the same sensor can work for different section of the same process, which are not in the same temperature range, and keep a high resolution on the output. The calibration and/or re-scaling are performed via the digital communication link. FIG. 7 shows all the different calibrations that can be performed on the integrated sensor transmitter.

A total of 5 different calibrations are available 89. The first one is the output calibration 91. This action allows the calibration of the output current generated by the Digital to Analog converter. It is performed on two points located at the extremity of current range, at 4 mA 101 and 20 mA 103. Two output calibration parameters are then calculated by the computer 43 or hand held calibrator 49 and then stored for output calculation.

The second calibration procedure is factory offset 93. The factory offset is performed by recording the reading form the sensing element at a pre-determined temperature 105. This reading represents the offset from this particular device to the theoretical values used for linearization.

The third calibration procedure is the operating range 95. The operating range can be set anywhere inside the total span of the integrated sensor transmitter, which is −200° to 800° C. When the range is changed, default values of calibration (Zero and Span) are set 107 to have the output current swings from 4 to 20 mA between the low and high values of the range. The range value is stored in the digital scaler module 22.

The fourth calibration procedure is the 1 Point Calibration 97. This calibration is perform by adjusting the offset parameter 109 in order to have the output current from the integrated sensor transmitter matched with the known temperature at which the sensing element is exposed. For this calibration, one external reference is needed.

Finally, the fifth calibration procedure is the 2 Points Calibration 99. This calibration is performed when we want to get the most accurate precision form the integrated sensor transmitter on a given range. Two external reference points are needed for this procedure. When the sensing element is at the first reference point the value is then recorded 111 in memory. After, the sensing element is brought to the second reference point and the value is recorded 113 in memory. The last operation is the calculation of the new calibration parameters (Zero and Span) 115. This is performed by the processor in the digital scaler 22 and can be done at any time.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A remotely programmable sensor and device for measuring a physical quantity of a medium comprising:

a sensor for measuring said physical quantity of said medium and providing an electrical output within an operational range;

a scaler module for receiving said electrical output and for producing a scaled analog signal as a function of said electrical output and a scale selection definition;

a data interface for receiving programming data from an external computer and for providing said scale selection definition to said scaler module, such that said operational range of said electrical output is matched to cover an external device operating range so as to provide high resolution to said external device, wherein said sensor and device are integrated as a probe, said probe having a tip portion and a transition portion, and wherein said sensor is contained in said tip portion and said scaler module is contained in said transition portion.

2. The remotely programmable sensor and device as claimed in claim 1, wherein said scaler module is digital and comprises a conditioning module for producing an analog signal from said sensor electrical output, an analog to digital convener in communication with said conditioning module for receiving said analog signal and converting it into a digital value, a scaler for scaling said digital value according to a scale selection input; further comprising a digital to analog convener for receiving said scaled digital value and converting said scaled digital value into an analog value output.

3. The remotely programmable sensor and device as claimed in claim 1, wherein said physical quantity is temperature and said sensor is a resistive temperature detector.

4. The remotely programmable sensor and device as claimed in claim 1, wherein said data interface is digital over a communication link.

5. The remotely programmable sensor and device as claimed in claim 1, wherein said scaler module is an analog tunable scaler comprising at least one adjustable component for scaling said analog signal according to said scale selection definition.

6. The remotely programmable sensor and device as claimed in claim 1, wherein said tip portion and said transition portion are connected in a detachable manner.

7. The remotely programmable sensor and device as claimed in claim 6, wherein said tip portion and said transition portion are fabricated from a non-corroding conducting metal.

8. The remotely programmable sensor and device as claimed in claim 1, wherein said tip portion and said transition portion are contained in a unitary housing.

9. The remotely programmable sensor and device as claimed in claim 2, wherein said data interface receives said scaled digital value from said scaler module and provides said scaled digital value to said external device.

10. The remotely programmable sensor and device as claimed in claim 2, wherein said conditioning module is a Wheatstone bridge, said sensor having a resistance variable as a function of said physical quantity.

11. The remotely programmable sensor and device as claimed in claim 2, wherein said analog to digital converter includes a built-in auto-calibration module.

12. The remotely programmable sensor and device as claimed in claim 4, wherein said communication link comprises a serial link.

13. The remotely programmable sensor and device as claimed in claim 5, wherein said adjustable component is a potentiometer.

* * * * *